United States Patent
Hou et al.

(10) Patent No.: US 12,034,692 B2
(45) Date of Patent: Jul. 9, 2024

(54) AUTOMATIC NOTIFICATION OF DATA CHANGES

(71) Applicant: Microsoft Technology Licensing, LLC, Redmond, WA (US)

(72) Inventors: Zhitao Hou, Beijing (CN); Rui Ding, Beijing (CN); Haidong Zhang, Beijing (CN); Eslam Elsawy, Redmond, WA (US); Sanyam Chaudhary, Kirkland, WA (US); Mina Mikhail, Redmond, WA (US); Nikhil Gaekwad, Redmond, WA (US); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/417,283

(22) PCT Filed: Jan. 4, 2019

(86) PCT No.: PCT/CN2019/070331
§ 371 (c)(1),
(2) Date: Jun. 22, 2021

(87) PCT Pub. No.: WO2020/140247
PCT Pub. Date: Jul. 9, 2020

(65) Prior Publication Data
US 2021/0377203 A1 Dec. 2, 2021

(51) Int. Cl.
*G06F 15/16* (2006.01)
*G06F 16/23* (2019.01)
*H04L 51/224* (2022.01)

(52) U.S. Cl.
CPC ........ *H04L 51/224* (2022.05); *G06F 16/2358* (2019.01)

(58) Field of Classification Search
CPC ............................ H04L 51/24; G06F 16/2358
See application file for complete search history.

(56) References Cited

U.S. PATENT DOCUMENTS 8,024,330 B1 * 9/2011 Franco .................... G06F 16/00
707/724
2004/0010522 A1 1/2004 Shulok
(Continued)

FOREIGN PATENT DOCUMENTS

EP 3185205 A1 6/2017

OTHER PUBLICATIONS

"International Search Report and Written Opinion Issued in PCT Application No. PCT/CN19/070331", dated Sep. 29, 2019, 10 Pages.
(Continued)

*Primary Examiner* — John B Walsh
(74) *Attorney, Agent, or Firm* — Schwegman Lundberg & Woessner, P.A.

(57) ABSTRACT

A method provides an automatic notification manner of data changes. After collecting information related to a target user (202) such as a dataset, a data dashboard, or a data report, the analysis preference of the user can be determined based on the collected information (204). Then, upon the dataset is updated, a variety of critical data changes in the dataset may be detected as an alert (206), and a notification related to the alert may be provided to the user via various manners (208). The method does not require the user to manually configure or create an alert rule for data changes, which makes data-driven alerting much easier for the user, thereby improving the user experience.

13 Claims, 8 Drawing Sheets

(56) References Cited

U.S. PATENT DOCUMENTS

| | | |
|---|---|---|
| 2004/0158367 A1 | 8/2004 | Basu et al. |
| 2012/0009894 A1 | 1/2012 | Franco et al. |
| 2012/0232951 A1 | 9/2012 | Su et al. |
| 2014/0207592 A1 | 7/2014 | Kavis et al. |
| 2016/0124960 A1* | 5/2016 | Moser .................. G06T 11/206 707/723 |
| 2016/0125083 A1* | 5/2016 | Dou ...................... G06F 16/951 707/709 |
| 2016/0330279 A1* | 11/2016 | Patel .................. G06F 16/2358 |
| 2019/0318291 A1* | 10/2019 | Diriye .................... H04L 41/16 |

OTHER PUBLICATIONS

"Search Report Issued in European Patent Application No. 19907472. 5", dated Sep. 16, 2022, 9 Pages.
Communication under Rule 71(3) Received for European Application No. 19907472.5, mailed on Mar. 13, 2024, 09 pages.

* cited by examiner

AUTOMATIC NOTIFICATION OF DATA CHANGES

CROSS-REFERENCE TO RELATED APPLICATION

This application is a U.S. National Stage Filing under 35 U.S.C. 371 of International Patent Application Serial No. PCT/CN2019/070331, filed Jan. 4, 2019, and published as WO 2020/140247 A1 on Jul. 9, 2020, which application and publication are incorporated herein by reference in their entirety.

BACKGROUND

Generally, users may use various databases to manage and monitor their data. A dataset is a collection of data, and it may be maintained in the database. For example, the dataset may include contents of a database table(s), each column of the table represents a particular variable, and each row of the table corresponds to a given member of the dataset in question. Data in the dataset may be viewed and queried by the user. In addition, data in the dataset also may be presented as a data dashboard or a data report which may comprises one or more charts. The data dashboard is an information management tool for visually displaying, tracking and analyzing the dataset, while the data report is document that makes some analyses on the dataset.

Data in the dynamic database is always changing. For example, some new entries may be added to the database, some old entries may be removed from the database, and values in some entries may be updated. As an example, a car database may be updated every day with the new records appended. The data changes are usually essential for decision-making, and thus some analysis systems can help users maintain situation awareness of how data being changed and keep them informed about the data changes that are important to the users.

SUMMARY

In embodiments of the present disclosure, there is provided an automatic notification manner of data changes. After collecting information related to a target user such as a dataset, a data dashboard, or a data report, the analysis preference of the user can be determined based on the collected information. Then, upon the dataset is updated, a variety of critical data changes in the dataset may be detected as an alert, and a notification related to the alert may be provided to the user via various manners. The automatic alert notification according to embodiments of the present disclosure does not require the user to manually configure or create an alert rule for data changes, which makes data-driven alerting much easier for the user, thereby improving the user experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, advantages and aspects of embodiments of the present disclosure will be made more apparent by describing the present disclosure in more detail with reference to drawings. In the drawings, the same or like reference signs represent the same or like elements, wherein.

DETAILED DESCRIPTION

Figure 1:
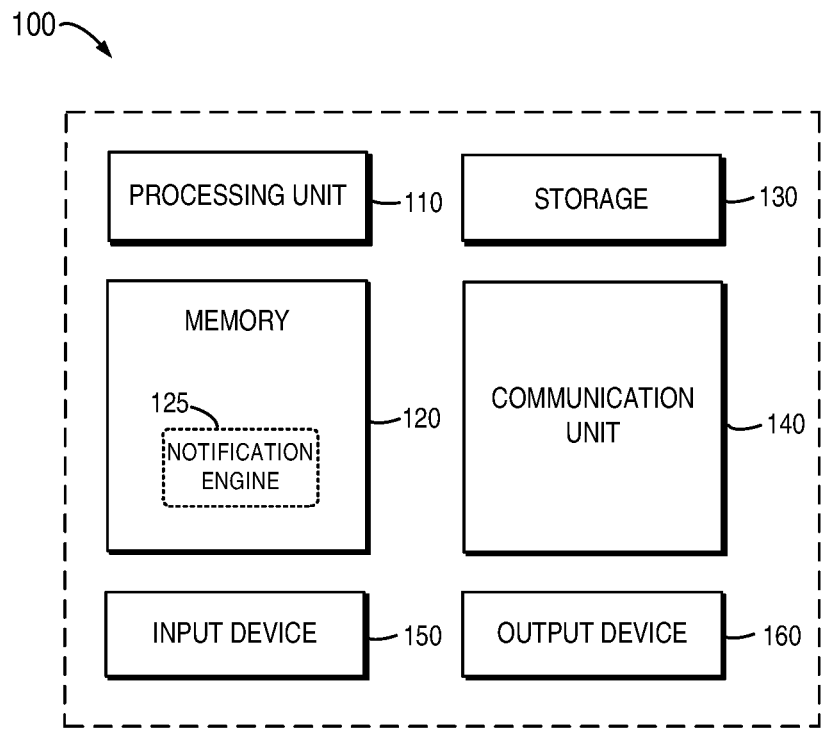
FIG. 1 illustrates a block diagram of a computing device/server in which one or more embodiments of the present disclosure may be implemented.

Embodiments of the present disclosure will be described in more detail below with reference to figures. Although the drawings show some embodiments of the present disclosure, it should be appreciated that the present disclosure may be implemented in many forms and the present disclosure should not be understood as being limited to embodiments illustrated herein. On the contrary, these embodiments are provided herein to enable more thorough and complete understanding of the present disclosure. It should be appreciated that drawing and embodiments of the present disclosure are only used for exemplary purposes and not used to limit the protection scope of the present disclosure.

As used herein, the term "includes" and its variants are to be read as open terms that mean "includes, but is not limited to." The term "based on" is to be read as "based at least in part on." The term "an embodiment" is to be read as "at least one embodiment." The term "another embodiment" is to be read as "at least one other embodiment." The term "some embodiments" is to be read as "at least some embodiments." Definitions of other terms will be given in the text below.

Traditionally, many analysis systems or intelligence systems have supported the data-driven alerting functionalities that allow users to monitor their data, and enable the user to get notified or informed when certain data changes happen, which may be important to them and require their awareness or attention. However, traditional data-driven alerting solutions are mainly passive solutions that are initiated by the users and require explicit configurations from the users. Specifically, the users need to create or configure the corresponding alert rules for the metrics that they want to monitor via the user interface (UI). Alert rules are certain conditions that if they are satisfied, the system should trigger corresponding alerts and notify the users. For example, if a user wants to be alerted when a value meets a high threshold 60 or a low threshold 10, the user needs to configure two alert rules: value being greater than 60 and value being smaller than 10. Based on the alert rules that the users have configured, the analysis system will detect at the backend if the alert rules are met when the dataset is changed, and send out the notification to the user as appropriate if any alert is triggered.

As seen from the above, traditional alert notification solution requires intensive manual efforts from the users for configuring the alert rules. The users have to find corresponding UI, which may not be very visible, and learn how to configure the alerting rule(s), which sometimes requires many clicks. In addition, the users are required to create appropriate visualizations and pin them on dashboard so the alerts can be set against them. However, many users may not have their own dashboards or data reports. Therefore, although the alerts detection and notification are automatically handled by the analysis system based on the configured alert rules, specifying the alerts is mainly a manual and burdensome process for the users. In addition, in some cases, the administrator may help to configure the alert rules for the user, but it still needs the manual operations of the administrator. Thus, traditional ways for alert notification are complex and unintelligent, which decrease the user experience.

To this end, a new automated method for data-driven alerting is proposed in embodiments of the present disclosure. After collecting information of a target user such as a dataset, a data dashboard, or a data report, the analysis preference may be determined based on the collected information. Then, upon the dataset is updated, a variety of critical data changes in the dataset may be detected as alerts, and a notification related to the alerts will be provided to the user via various manners. The automatic alert notification according to embodiments of the present disclosure does not require the user to manually configure or create an alert rule for data changes, which makes data-driven alerting much easier for the user, thereby improving the user experience. In addition, some embodiments of the present disclosure not only can reduce the configurations for user, but also can recommend some diversified alerts that the users may be not aware of.

Reference is made below to FIG. 1 through FIG. 7 to illustrate basic principles and several example embodiments of the present disclosure herein. FIG. 1 illustrates a block diagram of a computing device/server 100 in which one or more embodiments of the present disclosure may be implemented. It would be appreciated that the computing device/server 100 described in FIG. 1 is merely for illustration but not limit the function and scope of embodiments of the present disclosure in any manners.

As shown in FIG. 1, the computing device/server 100 is in the form of a general-purpose computing device. Components of the computing device/server 100 may include, but are not limited to, one or more processor(s) or processing unit(s) 110, a memory 120, a storage device 130, one or more communication unit(s) 140, one or more input device(s) 150, and one or more output device(s) 160. The processing unit 110 may be a physical or virtual processor and perform various processes based on programs stored in the memory 120. In a multiprocessor system, a plurality of processing units may execute computer executable instructions in parallel to improve parallel processing capability of the computing device/server 100.

The computing device/server 100 typically includes various computer storage media. The computer storage media may be any media accessible by the computing device/server 100, including but not limited to volatile and non-volatile media, or removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 120 may include a notification engine 125 for providing an automatic notification of data changes, which has one or more sets of program module configured to perform methods and functions of various embodiments described herein. The storage device 130 can be any removable or non-removable media and may include machine-readable media such as a flash drive, disk, and any other media, which can be used for storing information and/or data and accessed within the computing device/server 100.

The computing device/server 100 may further include additional removable/non-removable or volatile/non-volatile storage media. Although not shown in FIG. 1, a magnetic disk drive is provided for reading and writing from/to a removable and non-volatile disk (e.g., "a floppy disk") and an optical disk drive may be provided for reading or writing from/to a removable non-volatile optical disk. In such cases, each drive is connected to the bus (not shown) via one or more data media interfaces.

The communication unit 140 communicates with another computing device via communication media. Additionally, functions of components in the computing device/server 100 may be implemented in a single computing cluster or a plurality of computing machines that are communicated with each other via communication connections. Therefore, the computing device/server 100 can be operated in a networking environment using a logical connection to one or more other servers, network personal computers (PCs), or another network node.

The input device 150 can include one or more input devices such as a mouse, keyboard, tracking ball and the like. The output device 160 can include one or more output devices such as a display, loudspeaker, printer, and the like. The computing device/server 100 can further communicate, via the communication unit 140, with one or more external devices (not shown) such as a storage device or a display device, one or more devices that enable users to interact with the computing device/server 100, or any devices that enable the computing device/server 100 to communicate with one or more other computing devices (for example, a network card, modem, and the like). Such communication can be performed via input/output (I/O) interfaces (not shown). Next, reference is made below to FIGS. 2-7 to specify example embodiments of the present disclosure.

Figure 2:
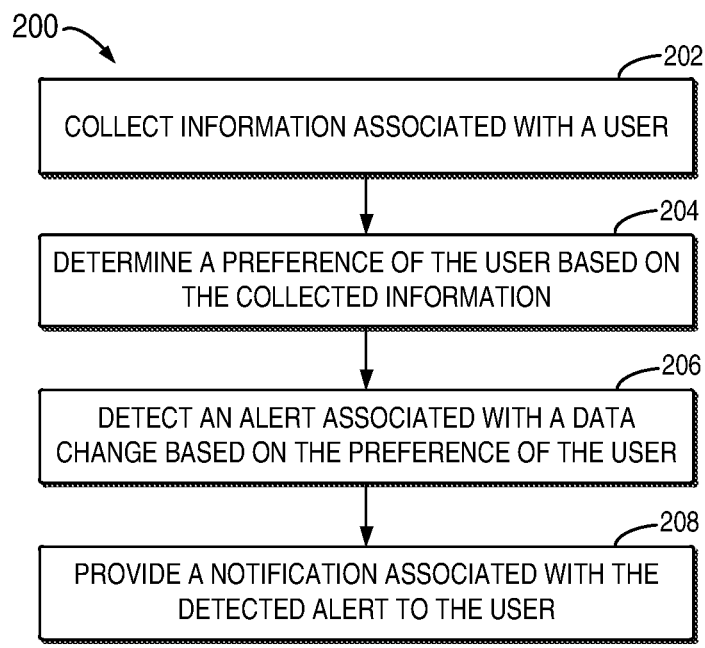
FIG. 2 illustrates a flow chart of a method for automatic notification of data changes according to embodiments of the present disclosure.

FIG. 2 illustrates a flow chart of a method 200 for automatic notification of data changes according to embodiments of the present disclosure. It should be appreciated that the method 200 may be executed by the computing device/server 100 described with reference to FIG. 1.

At 202, information associated with a user is collected, where the information includes at least one of a dataset, a data dashboard, a data report, and usage information associated with the user. The collected information of the user may be the data per se or data visualization created, shared and/or visited by the user, and it may be also referred to as "artifact". For example, the dashboard in an analysis system may be obtained as the collected information. Moreover, a user may create or access a plurality of data dashboard and/or data reports in the analysis system. In some embodiments, the notification engine may notify data changes for all users. Alternatively, the notification engine may only notify data changes for one or more specific types of users. The collected information generally does not involve personal data related to the users. In addition, it is to be understood that if the personal data related to the user is collected, it may need to get the consent from the user, and the collected data should comply with the legal privacy policy.

Generally, a data dashboard is an electronic interface that aggregates and visualizes data from multiple sources, such as datasets or databases, locally hosted files, and web services. The dashboard allows users to monitor their data by displaying historical trends, actionable data, and real-time information and so on.

At 204, a preference of the user is determined based on the collected information. The analysis preference of the user, that is, what kind of analysis the user would like to make, may be determined, so that the one or more subsequent detected alerts may be interested to the user. The term "preference" herein may indicate the interest and/or focus of a user, and in some embodiments, the preference may be represented as a query. For example, if a user always queries and visits a certain chart, then it indicates that the user is interested in this chart.

At 206, an alert associated with a data change is detected based on the determined preference of the user upon the dataset is updated. For example, each time the dataset is updated such as added or modified, the analysis system will trigger the detection of the alert so as to discovery the critical data changes that may be interested to the user. Because of the determined preference information, the detected alert can be greatly interested to the user, thereby avoiding pushing the uninterested content to the user.

At 208, a notification associated with the detected alert is provided to the user. For example, the corresponding notification regarding the alert may be sent to the user immediately, or periodically such as every week, depending on the user configuration or default configuration. In addition, various manners may be used to provide the notification to the user, including but not limited to, an email, a mobile message, a feed, a notification center and a homepage presentation. For example, the user may subscribe the feed of the automatic notification, and the notification will be pushed to the user via a RSS reader once one or more alerts are generated.

According to the method 200 of the present disclosure, it does not require the user to manually configure or create an alert rule for data changes; instead, the analysis system identifies the preference information of each user automatically. In this way, the data-driven alerting is made much easier for the user, thereby improving the user experience.

In some embodiments, the automatic notification function according to the present disclosure may be provided as an optional function by the administrator or the developer. For example, if the administrator does not enable the automatic notification function or does not purchase this function, the automatic notification function will not be enabled. Alternatively, or in addition, whether the automatic notification function is enabled may depend on the availability of the hardware and/or software resources. For example, if the hardware and/or software resources are sufficient, the automatic notification function according to the present disclosure may be enabled; otherwise, it may be disabled.

Figure 3:
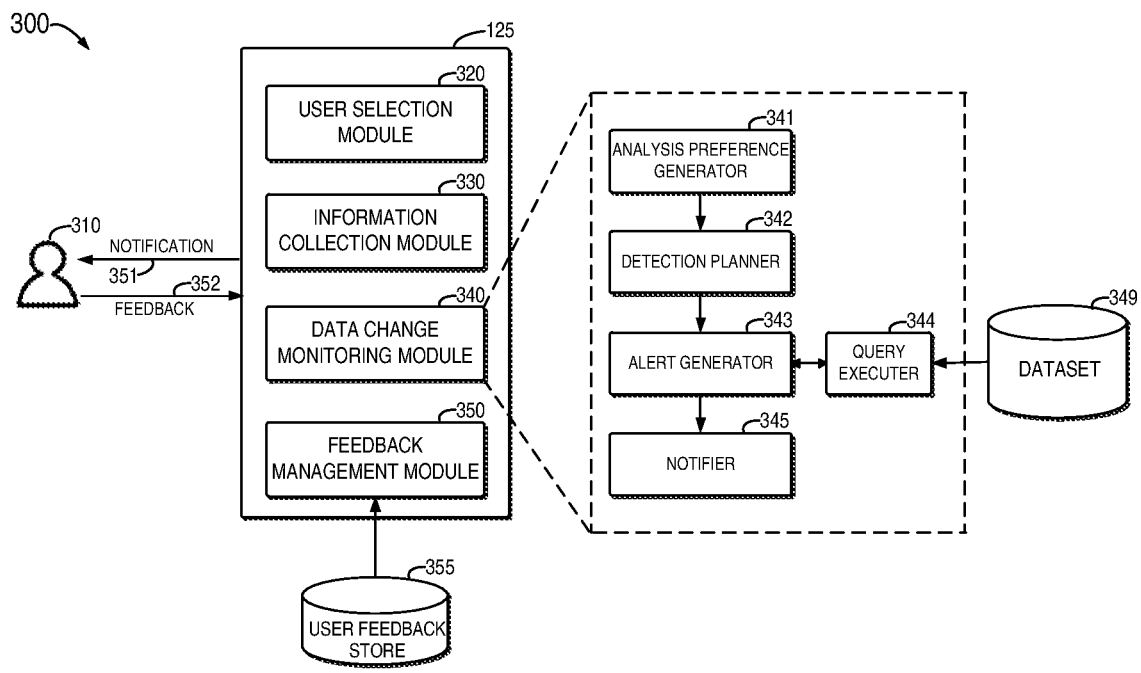
FIG. 3 illustrates a schematic diagram of an example environment for automatic notification of data changes according to embodiments of the present disclosure.

FIG. 3 illustrates a schematic diagram of an example environment 300 for automatic notification of data changes according to embodiments of the present disclosure. As shown in FIG. 3, the environment 300 includes a user 310 and the notification engine 125 as shown in FIG. 1, the notification engine 125 for example includes a user selection module 320, an information collection module 330, a data change monitoring module 340 and a feedback management module 350. The user 310 may be associated with a dataset 349, for example, the user 310 may manage the dataset 349, or the user 310 may be shared with the dataset 349 by another user.

The user selection module 320 may be used to select one or more target users for alert notification. The user selection module 320 identifies a set of users as the audience of the alerting, who are going to get notified for the interesting changes in their data automatically. Optionally, the user selection module 320 may monitor data changes and send data-driven alerts to all users. Alternatively, the user selection module 320 may only select some users satisfying a certain criteria. In some embodiments, an access frequency of each user to the dataset during a period of time may be determined, and whether selecting a user as a target user for notification may depend on the determined access frequency. For example, if the user 310 has not visited the dataset for three weeks, the user 310 may be regarded as a target user for notification. In other words, the user selection module 320 may select the non-engaged users as the target users based on the user visits during specific period of time to keep them aware of the changes in their data and encourage them to access the dataset more frequently to check their data. In this way, suitable users may be selected as the target users, thereby improving the accuracy of alert notification.

The information collection module 330 may be used to collect the corresponding information of the user 310, and the collected information of the user 310 may include dataset(s), data dashboard(s), data report(s), and visualization(s) created, or visited by the user 310, or shared to the user 310 by another user. In some embodiments, the information collection module 330 may only select most visited datasets by the user 310. In some embodiments, if the user 310 does not create or upload any dataset, the information collection module 330 may select other datasets recently shared with the user 310. Alternatively, or in addition, if the user does not create any dashboard or visualization, the information collection module 330 may select dashboards or visualizations created by other users in the same organization, group or team. In this way, even no dataset, dashboard or report is created by the user 310, embodiments of the present disclosure can still achieve the automatic notification function for the user. That is, the preference information of the user may be collected from the user's dataset, dashboard, data report, user interaction, as well as the organizational relationships.

Continuing to refer to FIG. 3, the data change monitoring module 340 may be used to generate analysis preference, monitor data changes, generate alerts and provide notifications. For example, the data change monitoring module 340 may periodically monitor the data changes, and if the dataset is updated, the data change monitoring module 340 will trigger the detection of the alerts based on the data changes of this dataset. As shown in FIG. 3, the data change monitoring module 340 may include an analysis preference generator 341, a detection planner 342, an alert generator 343, a query executer 344, and a notifier 345. The alerts detection may be done by the detection planner 342 and the alert generator 343, and the result will be a list of alert candidates saved in an alert store (not shown).

The analysis preference generator 341 may be used to generate an analysis preference for target user(s). For example, the analysis preference generator 341 figures out the analysis preference for each target user based on the collected information (such as datasets, dashboards, data reports, other visualizations, query logs, and so on). In embodiments of the present disclosure, the analysis preference represents what analysis a user is interested in or cares about for a specific dataset, and the analysis preference may be presented as a set of analysis queries. Analysis preference may be different per user and per dataset. According to embodiments of the present disclosure, the analysis preference generator 341 may extract or infer the analysis preference based on a variety of information associated with the user, and the generated analysis preference may be stored in an analysis preference store (not shown).

Figure 4:
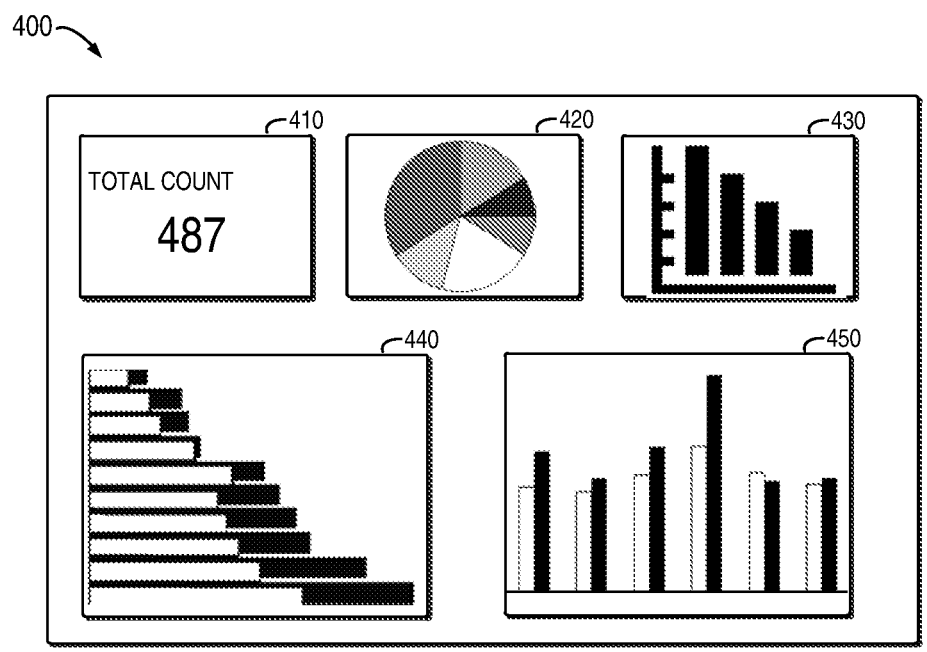
FIG. 4 illustrates a schematic diagram of an example data dashboard according to embodiments of the present disclosure.

In some embodiments, the analysis preference may be determined from the visualizations (such as charts) on the corresponding data dashboards or data reports. For example, FIG. 4 illustrates a schematic diagram of an example data dashboard 400 according to embodiments of the present disclosure. As shown in FIG. 4, the data dashboard 400 includes charts 410, 420, 430, 440 and 450, which may be different types of charts. Based on the charts 410, 420, 430, 440 and 450 in the data dashboard 400 of the user, analysis preference generator 341 may determine the analysis preference of the user. For example, the charts in the data dashboard 400 represent the concerns of the user, and data changes related to these concerns may be interested to the user.

Generally, different charts on the data report and/or the data dashboard may indicate different degrees of importance, and they may have different weights for generating the analysis preference. In some embodiments, after extracting a plurality of charts from the data report and/or the data dashboard, weight of each chart may be determined based on a size and a location of each chart on the corresponding data report or the data dashboard. Then, the analysis preference of the user may be determined by consideration of the weights of the plurality of charts.

Figure 5A:
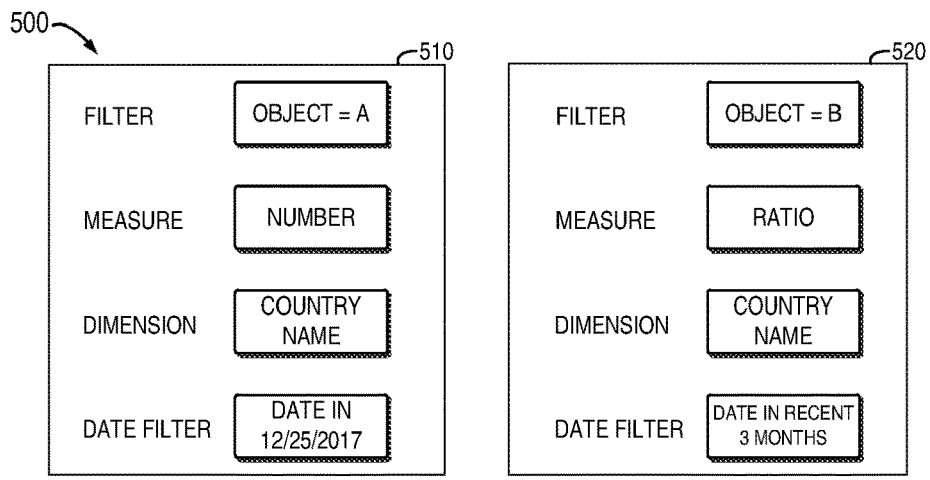
FIGS. 5A-5C illustrate an example process of generating an analysis preference according to embodiments of the present disclosure.
Figure 5B:
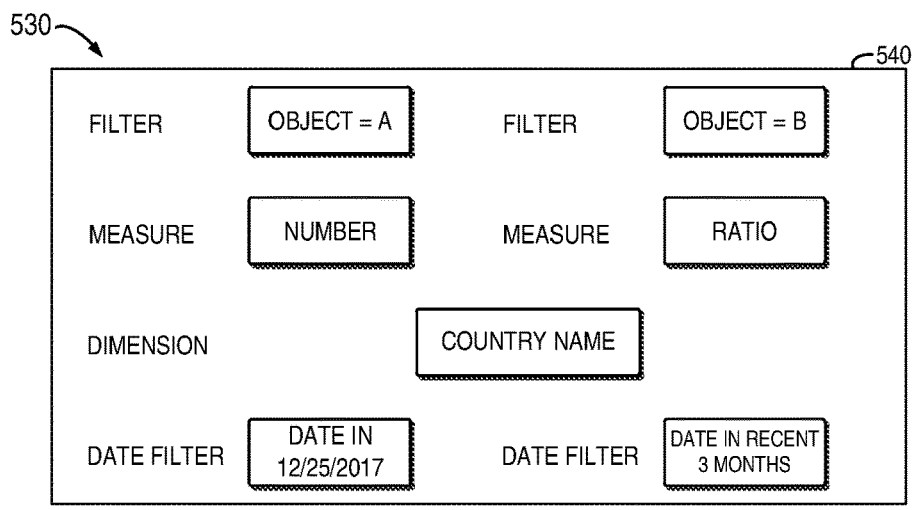
Figure 5C:
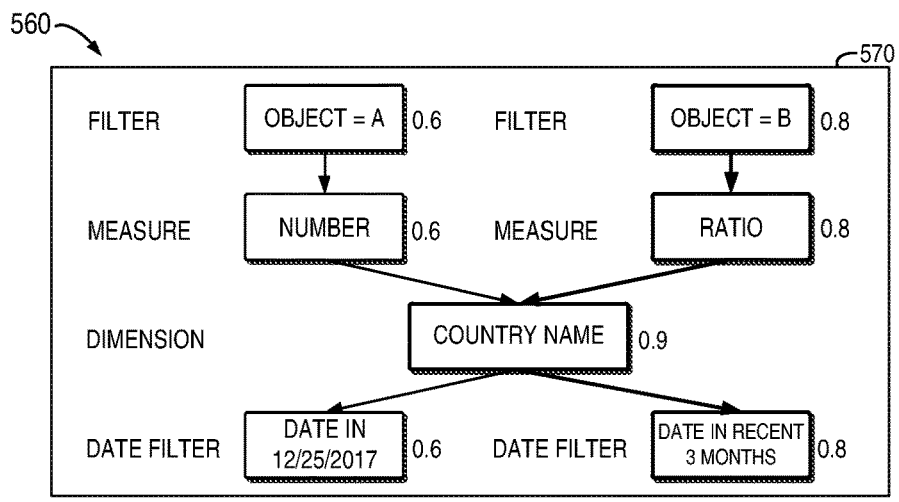

Now turning to FIGS. 5A-5C, which illustrate an example process of generating an analysis preference according to embodiments of the present disclosure. For example, each chart may be represented as a query, each query is logically a tuple of elements including Filter, Measure, Dimension and Date Filter, and the query elements may be extracted from each chart on the data dashboard and/or data report. Filter may represent a condition of a chart, Measure may represent a Y-axis of a chart, Dimension may represent an X-axis of a chart, and Date Filter may represent a date of data in the chart.

As shown in the diagram 500 of FIG. 5A, query 510 and query 520 are extracted from two charts respectively, represented as analysis building blocks. For example, query 510 may be extracted from chart 430 in FIG. 4. Upon analysis of the two queries, it is seen that the two queries have different Filters, different Measures, different Date Filters, but have the same Dimension, i.e., country name. Thus, the analysis preference generator 341 may merge the two queries to build a graph of which the nodes are the four types of query elements, i.e. Dimension, Measure, Filter, and Date Filter, and the paths are corresponding queries. As shown in the diagram 530 of FIG. 5B, the same blocks are merged to form graph 540.

The blocks in FIG. 5B may be linked based on the queries, and query scores may be different based on the size and/or position of the corresponding chart on the dashboard or data report. As shown in the diagram 560 of FIG. 5C, the blocks are linked in graph 570, and each block may be assigned with a ranking score for importance, because more important charts will be larger and be placed at better position. Then, the analysis preference generator 341 may traverse the graph 570 to extract top N highest queries from the analysis building blocks graph 570 as the analysis preference. For example, if the analysis preference generator 341 only set one query, it may generate the following query elements of analysis preference: object=b, ratio, country name, and data in recent 3 months.

Referring back to FIG. 3, the detection planner 342 may be used to build a list of detection plans. Each plan may be derived from an analysis query in the corresponding analysis preference, with two time periods as filters for the "current data" and the "previous data", respectively. For example, for the car data, if the latest data is for the data on Sep. 7, 2018, the detection planner 342 may generate alert plans including: "Amount by Country for Sep. 7, 2018 versus Amount by Country for Sep. 6, 2018" (compare current day with previous day); "Amount by Country for September 1-7, 2018 versus Amount by Country for August 25-31, 2018" (compare current week with previous week); "Amount by Country for Sep. 7, 2018 versus Amount by Country for Sep. 7, 2017" (compare with the same day in previous year); and "Daily amount for September 1-7, 2018 versus daily amount from August 25-31, 2018" (compare the time-series of this with the same day in previous week).

The alert generator 343 may be used to generate alert(s). The alert generator 343 may detect interesting facts or patterns in the data changes based on the generated detect plan. For example, the query executer 344 will first execute the queries to get data to be analyzed from the dataset 349 for "current data" and "previous data", and then it will perform various analysis to identify possible alert candidates. Then, the alert generator 343 may rank all the alert candidates and select the final alert(s) which rank first.

In some embodiments, a plurality of analyses may be performed to detect alerts. For example, the alert generator 343 may perform a diff-analysis by comparing the obtained data in current version and the corresponding data in previous version to detect whether there is at least one of a significant value change, a ratio change, and an abnormity. Alternately, or in addition, the alert generator 343 may perform a time series analysis on the obtained data in current version and the corresponding data in previous version to detect whether there is at least one of an outlier, a change point, a trend, a unimodality, and a clustering.

Figure 6A:
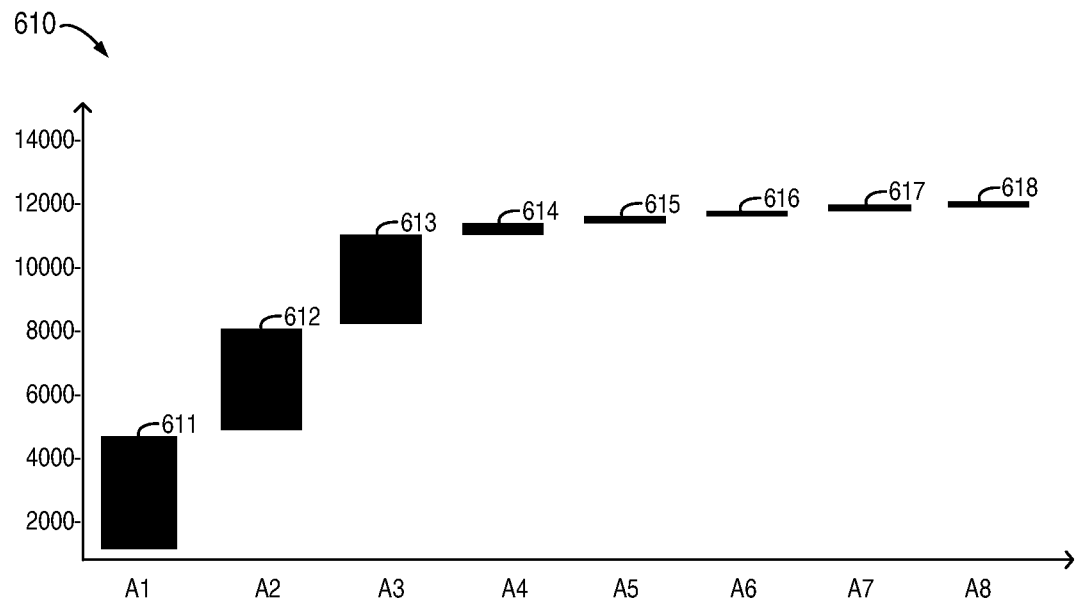
FIGS. 6A-6H illustrate schematic diagrams of example alert types according to embodiments of the present disclosure.
Figure 6B:
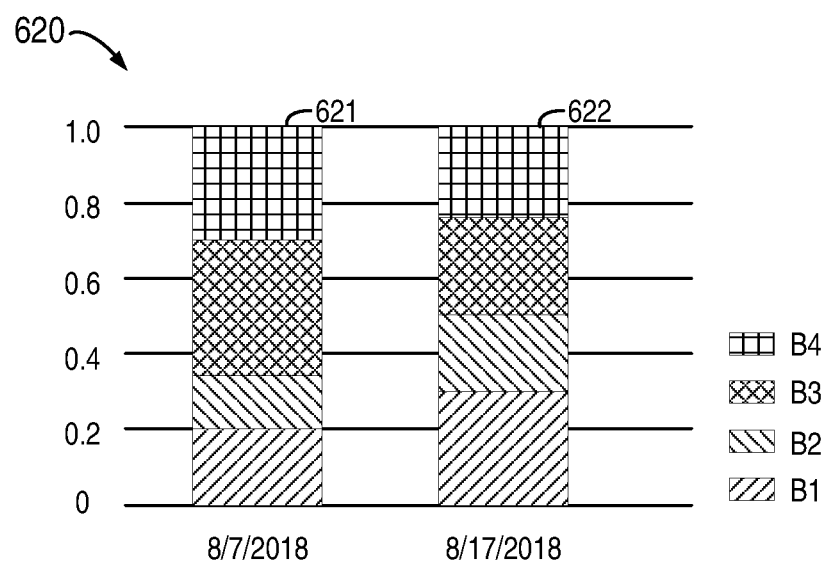
Figure 6C:
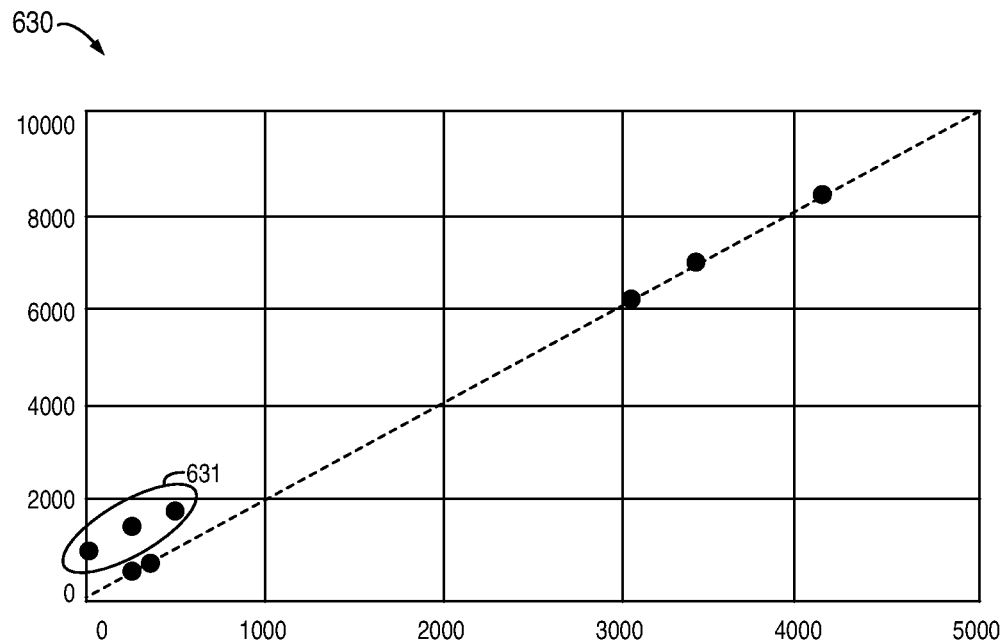

Now turning to FIGS. 6A-6H, which illustrate schematic diagrams of example alert types according to embodiments of the present disclosure. Diff-analysis is conducted by comparing data in current version and corresponding data in previous version. FIG. 6A illustrates a chart 610 indicating a delta change, which the value changes for A1, A2, A3, A4, A5, A6, A7 and A8 are shown as 611, 612, 613, 614, 615, 616, 617 and 618 respectively. As shown in FIG. 6A, the values of A1, A2 and A3 increased significantly, and the corresponding alert may be generated. FIG. 6B illustrates a chart 620 indicating a ratio change. From data 621 of Aug. 7, 2018 to data 622 of Aug. 17, 2018, the ratios of B2 and B1 increased significantly, and the corresponding alert may be generated. FIG. 6C illustrates a chart 630 indicating an abnormity. As shown in FIG. 6C, most individuals changed in a common proportional ratio (2000:1000), and some individuals in 631 increased abnormally even higher. Also, there may exist other individual increased even lower.

Figure 6D:
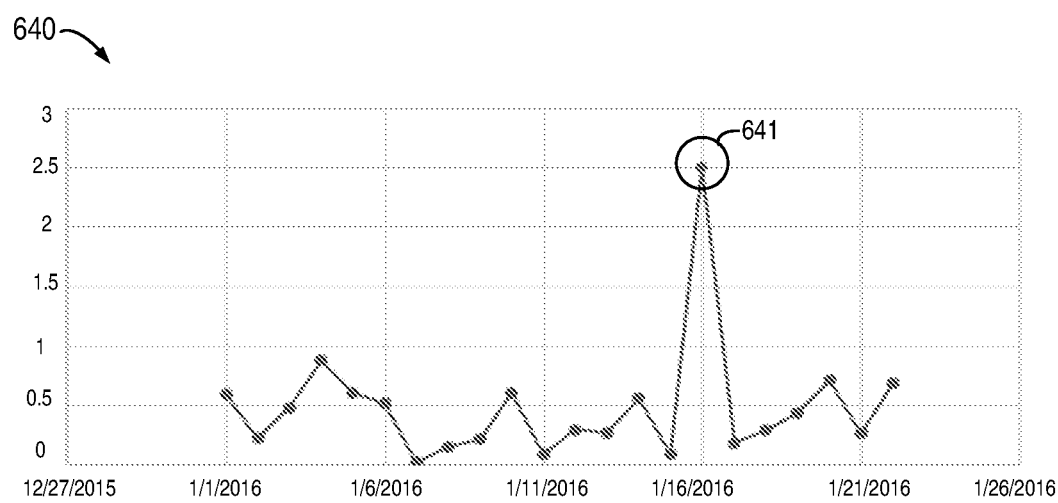
Figure 6E:
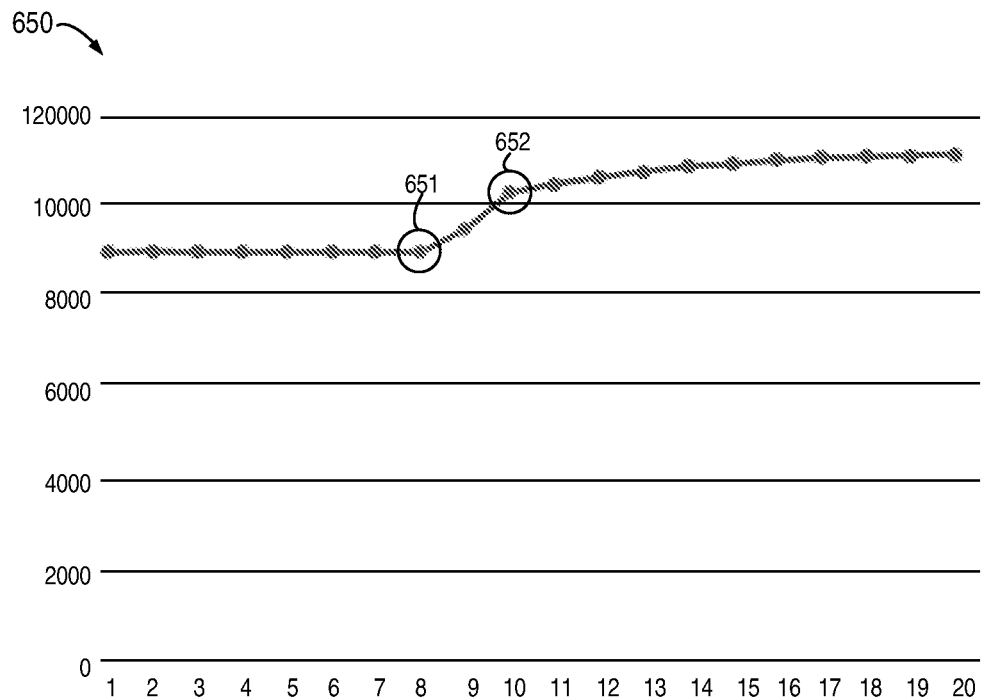
Figure 6F:
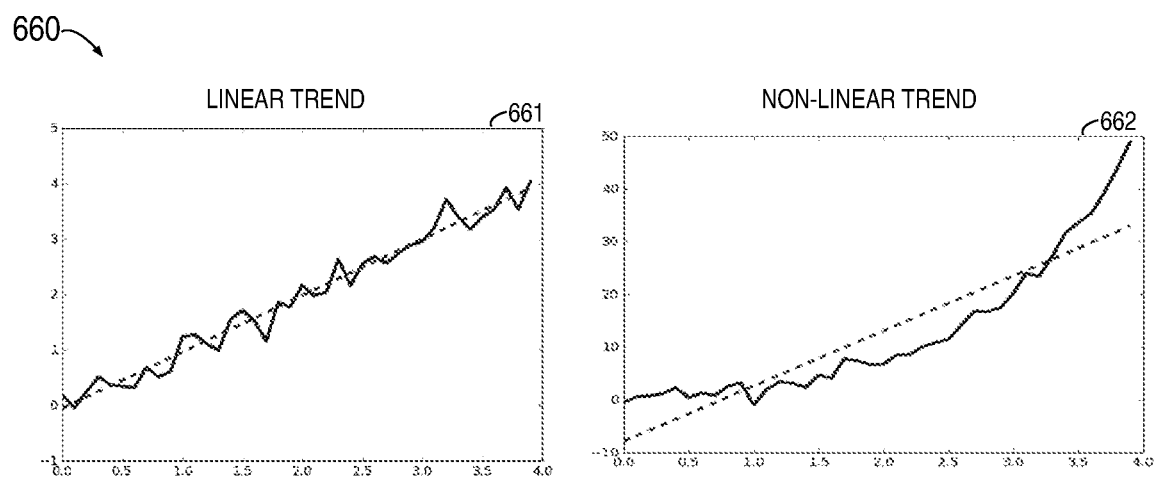
Figure 6G:
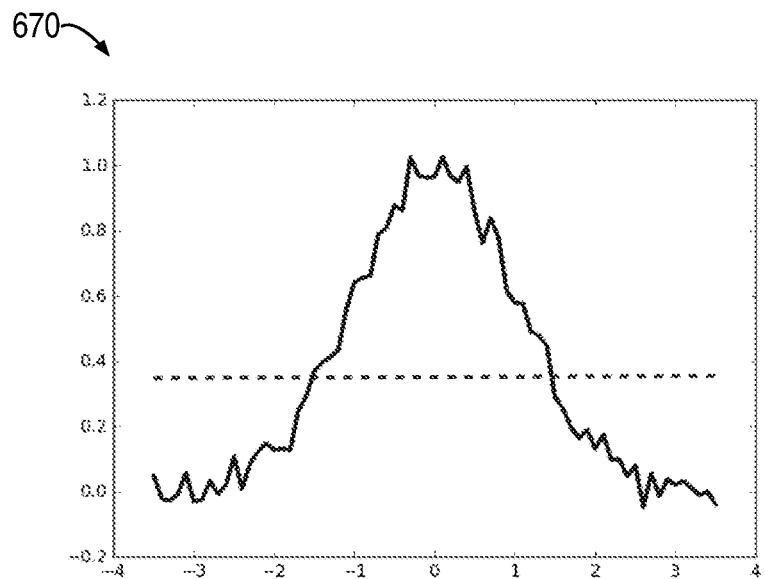
Figure 6H:
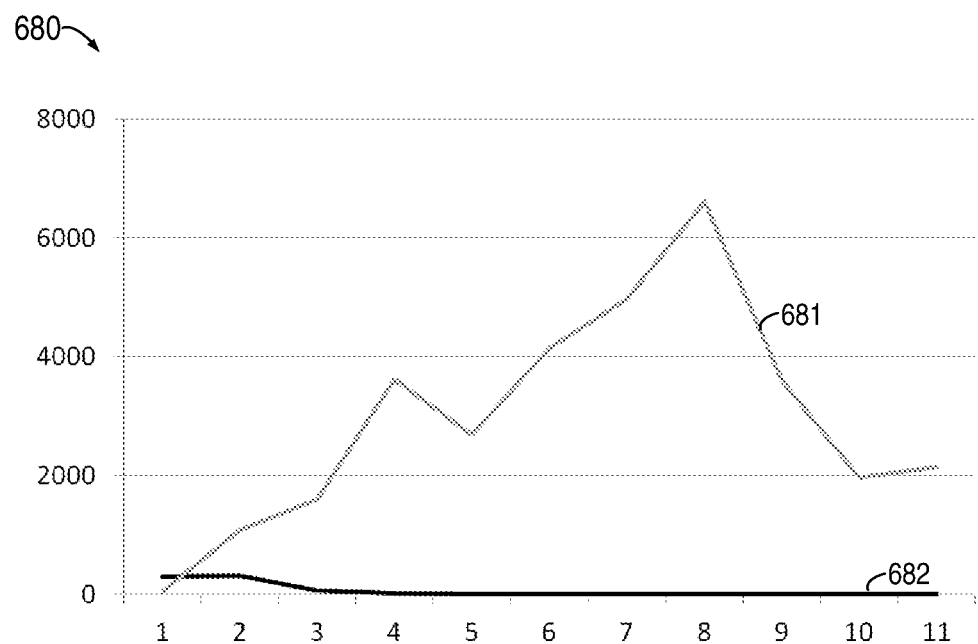

Time series analysis identifies pattern on new data points by considering data points both before and after update, and the immediate past data points are more interested to the users and may be assigned with higher weights. FIG. 6D illustrates a chart 640 indicating an example outlier 641, and FIG. 6E illustrates a chart 650 indicating a change start point 651 and a change end point 652. FIG. 6F illustrates a chart 660 indicating examples of trend, including a linear trend 661 and a non-liner trend 662. FIG. 6G illustrates a chart 670 indicating an example unimodality, which may be a peak or valley in the time series, and FIG. 6H illustrates a chart 680 indicating example clustering, which may cluster multiple lines into several clusters such as cluster 681 and cluster 682. By the above detection, the alert generator 343 may generate the corresponding alerts for notification to the user.

Traditionally, the alerting capability is limited, and traditional analysis systems mainly support simple, fixed, threshold-based alerting (e.g., a certain value goes above or below a threshold predefined by the user). However, the users are interested in and desire for more rich, dynamic, and latent information on data evolution, such as how rank or distribution changed, whether new outliers or new trending emerged, and prediction into what may happen in the near future. Embodiments according to present disclosure can detect more types of alerts by the diff-analysis, the time series analysis and so on. For example, assume that two versions of data seem similar at a glance, but actually they may be some data changes that the user wants to be aware of or get notified, for example the delta change, the ration change, the abnormity and so on. In this way, embodiments of the present disclosure can provide more rich types of alerts to the user, thereby improving the user experience.

Referring back to FIG. 3, the notifier 345 may be used to generate and provide the notification to the user. For example, if there are new alerts identified, the notification engine 125 will trigger the notification process to pick up alerts and send them to corresponding users as appropriate. The notifier 345 may be responsible for selecting alerts and notifying users via various channels such as emails, notification center, homepage presentation and so on.

In some embodiments, during the alert detection, the alert generator 343 may give each alert candidate a rank score based on its significance and/or relevance, and the alert candidate(s) ranked first will be regarded as the final alert, thereby avoiding too many alert for the user. In addition, the alert generator 343 may do some diversifications to make sure it can output different types of alerts instead of always outputting similar alerts that the user has seen before. For example, if a time series keeps growing up, it is not necessary to keep sending the trend alert.

Continuing to refer to FIG. 3, the feedback management module 350 may be used to manage the user feedback. As shown in FIG. 3, the notification engine 125 may send a notification 351 to the user 310. After reading the notification 351, the user 310 may provide a feedback 352 to the notification engine 125. The feedback management module 350 may manage the feedback or responses from the user 310 to check if the user likes the pushed alert notification. Such user feedback may be stored in user feedback store 355 and may be used as signals to improve the notification engine 125 to provide better alerts that are more tailored to the needs or interests of the user. In this way, embodiments of the present disclosure can provide personalized and adaptive alerts to the users.

Figure 7:
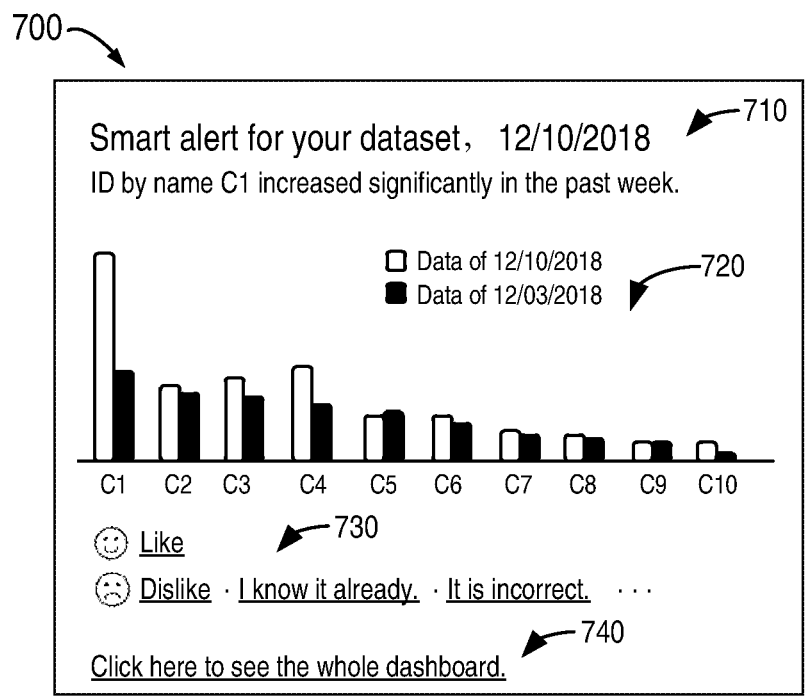
FIG. 7 illustrates a schematic diagram of an example notification email according to embodiments of the present disclosure.

For example, the notification may be an email, a mobile message, a feed, a notification center, a homepage presentation, or any other type of notification mechanism. For example, FIG. 7 illustrates a schematic diagram of an example notification email 700 according to embodiments of the present disclosure. As shown in FIG. 7, the notification email 700 may include a short text description 710 of the alert, a chart 720 of the alert, a feedback option 730, and a link 740 to the data dashboard or the data report. The description 710 recites a brief description of the alert, which includes the data object and the significant event. The chart 720 illustrates a chart which may be one chart in the user's dashboard. The feedback option 730 provides some feedback options such as like and dislike, as well as some specific reasons for dislike, which provides a convenient way for providing a feedback. If the user clicks an element in the feedback option 730, the notification engine 125 will obtain the feedback to the alert, and then update the preference of the user based on the received feedback so as to provide the more accurate alert for the user. The link 740 may be a hyperlink to the user's dashboard, by clicking the link 740, it may jump to the user's dashboard, thereby increasing the user engagement for the dataset and performing further exploration there. In some embodiments, the notification email 700 may also include the backend query of the alert so that the user is aware of the generation of the alert.

In some embodiments, the notification engine 125 may analyze a cause of the alert, and provide the cause in the notification 351 to the user 310. In some embodiments, the notification engine 125 may make a prediction to the dataset according to the detected alert and provide the notification including the prediction to the user. In this way, the user can know in advance the data trend. In addition, to enable the notification diversification and avoid repeated notification, the notification engine 125 may obtain the previous alerts that have been sent to the user previously, and decide whether to provide the notification to the user depend on the type of newly-detected alert. For example, if the same type of alerts have been sent to the user many times, the notification engine 125 may decide ceasing to provide the same type of alert to the user. Instead, the notification engine 125 will try to provide other types of alerts that provide interesting and important latent or implicit information. In this way, more rich alert types can be provided to the user.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single implementation. Conversely, various features that are described in the context of a single implementation may also be implemented in multiple embodiments separately or in any suitable sub-combination.

Some example embodiments of the present disclosure are listed below.

In one aspect, there is provided a computer-implemented method. The method comprises: collecting information associated with a user, wherein the information includes at least one of a dataset, a data dashboard, a data report, and usage information associated with the user; determining a preference of the user based on the collected information; in response to the dataset being updated, detecting an alert associated with a data change based on the determined preference of the user; and providing a notification associated with the detected alert to the user.

In some embodiments, wherein the collecting information associated with a user comprises: determining an access frequency of the user to the dataset during a period of time; and in response to the access frequency being below a predetermined threshold, determining the user as a target user for notification.

In some embodiments, wherein the determining a preference of the user comprises: extracting a plurality of charts from at least one of the data report and the data dashboard; determining weights of the plurality of charts based on a size and a location of each of the plurality of charts on the data report or the data dashboard; and determining the preference of the user based on the weights of the plurality of charts.

In some embodiments, wherein the determining a preference of the user comprises: in response to the data dashboard being absent for the user, obtaining a second data dashboard from a second user who is in the same team with the user; and determining the preference of the user based on the second data dashboard from the second user.

In some embodiments, wherein the detecting an alert associated with a data change comprises: in response to the dataset being updated, obtaining data to be analyzed from the dataset based on the preference; generating an alert candidate based on a set of analyses on the obtained data; and in response the alert candidate satisfying a predetermined condition, determining the alert candidate as the alert.

In some embodiments, wherein the generating an alert candidate comprises at least one of: performing a diff-analysis by comparing the obtained data in current version and the corresponding data in previous version to detect whether there is at least one of a significant value change, a ratio change, and an abnormity; and performing a time series analysis on the obtained data in current version and the corresponding data in previous version to detect whether there is at least one of an outlier, a change point, a trend, an unimodality, and a clustering.

In some embodiments, wherein the providing a notification associated with the detected alert to the user comprises: making a prediction to the dataset according to the detected alert; and providing the notification including the prediction to the user via at least one of an email, a mobile message, a feed, a notification center and a homepage presentation.

In some embodiments, wherein the providing a notification associated with the detected alert to the user comprises: obtaining one or more previous alerts that have been sent to the user; and in response to the detected alert being different type from the one or more previous alert, sending a notification email of the notification to the users, wherein the notification email includes a description of the alert, a chart of the alert, and a link to the data dashboard or the data report.

In some embodiments, wherein the notification email further includes a feedback option, and the method further comprises: receiving a feedback to the alert from the user via the feedback option; and updating the preference of the user based on the received feedback.

In another aspect, there is provided an electronic device. The electronic device comprises a processing unit and a memory coupled to the processing unit and storing instructions thereon. The instructions, when executed by the processing unit, perform acts comprising: collecting information associated with a user, wherein the information includes at least one of a dataset, a data dashboard, a data report, and usage information associated with the user; determining a preference of the user based on the collected information; in response to the dataset being updated, detecting an alert associated with a data change based on the determined preference of the user; and providing a notification associated with the detected alert to the user.

In some embodiments, wherein the collecting information associated with a user comprises: determining an access frequency of the user to the dataset during a period of time; and in response to the access frequency being below a predetermined threshold, determining the user as a target user for notification.

In some embodiments, wherein the determining a preference of the user comprises: extracting a plurality of charts from at least one of the data report and the data dashboard; determining weights of the plurality of charts based on a size and a location of each of the plurality of charts on the data report or the data dashboard; and determining the preference of the user based on the weights of the plurality of charts.

In some embodiments, wherein the determining a preference of the user comprises: in response to the data dashboard being absent for the user, obtaining a second data dashboard from a second user who is in the same team with the user; and determining the preference of the user based on the second data dashboard from the second user.

In some embodiments, wherein the detecting an alert associated with a data change comprises: in response to the dataset being updated, obtaining data to be analyzed from the dataset based on the preference; generating an alert candidate based on a set of analyses on the obtained data; and in response the alert candidate satisfying a predetermined condition, determining the alert candidate as the alert.

In some embodiments, wherein the generating an alert candidate comprises at least one of: performing a diff-analysis by comparing the obtained data in current version and the corresponding data in previous version to detect whether there is at least one of a significant value change, a ratio change, and an abnormity; and performing a time series analysis on the obtained data in current version and the corresponding data in previous version to detect whether there is at least one of an outlier, a change point, a trend, an unimodality, and a clustering.

In some embodiments, wherein the providing a notification associated with the detected alert to the user comprises: making a prediction to the dataset according to the detected alert; and providing the notification including the prediction to the user via at least one of an email, a mobile message, a feed, a notification center and a homepage presentation.

In some embodiments, wherein the providing a notification associated with the detected alert to the user comprises: obtaining one or more previous alerts that have been sent to the user; and in response to the detected alert being different type from the one or more previous alerts, sending a notification email of the notification to the users, wherein the notification email includes a description of the alert, a chart of the alert, and a link to the data dashboard or the data report.

In some embodiments, wherein the notification email further includes a feedback option, and the acts further comprise: receiving a feedback to the alert from the user via the feedback option; and updating the preference of the user based on the received feedback.

In a further aspect, there is provided a computer program product. The computer program product is stored in a non-transitory computer storage medium and comprises machine-executable instructions. The instructions, when executed on a device, cause the device to perform acts comprising: collecting information associated with a user, wherein the information includes at least one of a dataset, a data dashboard, a data report and usage information associated with the user; determining e a preference of the user based on the collected information; in response to the dataset being updated, detecting an alert associated with a data change based on the determined preference of the user; and providing a notification associated with the detected alert to the user.

In some embodiments, wherein the collecting information associated with a user comprises: determining an access frequency of the user to the dataset during a period of time; and in response to the access frequency being below a predetermined threshold, determining the user as a target user for notification.

In some embodiments, wherein the determining a preference of the user comprises: extracting a plurality of charts from at least one of the data report and the data dashboard; determining weights of the plurality of charts based on a size and a location of each of the plurality of charts on the data report or the data dashboard; and determining the preference of the user based on the weights of the plurality of charts.

In some embodiments, wherein the determining a preference of the user comprises: in response to the data dashboard being absent for the user, obtaining a second data dashboard from a second user who is in the same team with the user; and determining the preference of the user based on the second data dashboard from the second user.

In some embodiments, wherein the detecting an alert associated with a data change comprises: in response to the dataset being updated, obtaining data to be analyzed from the dataset based on the preference; generating an alert candidate based on a set of analyses on the obtained data; and in response to the alert candidate satisfying a predetermined condition, determining the alert candidate as the alert.

In some embodiments, wherein the generating an alert candidate comprises at least one of: performing a diff-analysis by comparing the obtained data in current version and the corresponding data in previous version to detect whether there is at least one of a significant value change, a ratio change, and an abnormity; and performing a time series analysis on the obtained data in current version and the corresponding data in previous version to detect whether there is at least one of an outlier, a change point, a trend, an unimodality, and a clustering.

In some embodiments, wherein the providing a notification associated with the detected alert to the user comprises: making a prediction to the dataset according to the detected alert; and providing the notification including the prediction to the user via at least one of an email, a mobile message, a feed, a notification center and a homepage presentation.

In some embodiments, wherein the providing a notification associated with the detected alert to the user comprises: obtaining one or more previous alerts that have been sent to the user; and in response to the detected alert being different type from the one or more previous alerts, sending a notification email of the notification to the users, wherein the notification email includes a description of the alert, a chart of the alert, and a link to the data dashboard or the data report.

In some embodiments, wherein the notification email further includes a feedback option, and the acts further comprise: receiving a feedback to the alert from the user via the feedback option; and updating the preference of the user based on the received feedback.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A computer-implemented method, comprising:
   collecting information associated with a user, the information including a dataset associated with the user;
   automatically determining, using a processor, an analysis preference of the user based on the collected information, wherein determining the analysis preference of the user comprises:
   extracting a plurality of charts from the dataset to produce at least one of a data report and a data dashboard;
   determining weights of the plurality of charts based on a size and a location of each of the plurality of charts on the data report or the data dashboard; and
   determining the preference of the user based on the weights of the plurality of charts;
   in response to the dataset being updated, selecting an alert associated with a data change based on the determined analysis preference of the user, the alert selected to be monitored, and when triggered, cause a notification to be generated; and
   providing the notification associated with the selected alert to the user.

2. The method according to claim 1, wherein the collecting information associated with a user comprises:
   determining an access frequency of the user to the dataset during a period of time; and in response to the access frequency being below a predetermined threshold, determining the user as a target user for notification.

3. The method according to claim 1, wherein determining the analysis preference of the user comprises:
   obtaining a data dashboard from a second user who is in a same team with the user; and determining the preference of the user based on the data dashboard from the second user.

4. The method according to claim 1, wherein selecting the alert associated with the data change comprises:
in response to the dataset being updated, obtaining data to be analyzed from the dataset based on the analysis preference;
generating an alert candidate based on a set of analyses on the obtained data; and
in response the alert candidate satisfying a predetermined condition, determining the alert candidate as the alert.

5. The method according to claim 4, wherein the generating an alert candidate comprises at least one of:
performing a diff-analysis by comparing the obtained data in current version and a corresponding data in previous version to detect whether there is at least one of a significant value change, a ratio change, and an abnormity; and
performing a time series analysis on the obtained data in current version and the corresponding data in previous version to detect whether there is at least one of an outlier, a change point, a trend, an unimodality, and a clustering.

6. The method according to claim 1, wherein the providing the notification associated with the selected alert to the user comprises:
making a prediction to the dataset according to the selected alert; and
providing the notification including the prediction to the user via at least one of an email, a mobile message, a feed, a notification center and a homepage presentation.

7. The method according to claim 1, wherein the providing the notification associated with the selected alert to the user comprises:
obtaining one or more previous alerts that have been sent to the user; and
in response to the selected alert being different type from the one or more previous alerts, sending a notification email of the notification to the users, the notification email including a description of the alert, a chart of the alert, and a link to a data dashboard or a data report.

8. The method according to claim 7, wherein the notification email further includes a feedback option, and the method further comprises:
receiving a feedback to the alert from the user via the feedback option; and
updating the preference of the user based on the received feedback.

9. An electronic device, comprising:
a processing unit;
a memory coupled to the processing unit and storing instructions thereon, the instructions, when executed by the processing unit, performing acts comprising:
collecting information associated with a user, the information including a dataset associated with the user;
automatically determining an analysis preference of the user based on the collected information, wherein determining the analysis preference of the user comprises:
extracting a plurality of charts from the dataset to produce at least one of a data report and a data dashboard;
determining weights of the plurality of charts based on a size and a location of each of the plurality of charts on the data report or the data dashboard; and
determining the preference of the user based on the weights of the plurality of charts;
in response to the dataset being updated, selecting an alert associated with a data change based on the determined analysis preference of the user, the alert selected to be monitored, and when triggered, cause a notification to be generated; and
providing the notification associated with the selected alert to the user.

10. The electronic device according to claim 9, wherein the collecting information associated with a user comprises:
determining an access frequency of the user to the dataset during a period of time; and
in response to the access frequency being below a predetermined threshold, determining the user as a target user for notification.

11. The electronic device according to claim 9, wherein selecting the alert associated with the data change comprises:
in response to the dataset being updated, obtaining data to be analyzed from the dataset based on the preference;
generating an alert candidate based on a set of analyses on the obtained data; and
in response the alert candidate satisfying a predetermined condition, determining the alert candidate as the alert.

12. The electronic device according to claim 11, wherein the generating an alert candidate comprises at least one of:
performing a diff-analysis by comparing the obtained data in current version and a corresponding data in previous version to detect whether there is at least one of a significant value change, a ratio change, and an abnormity; and
performing a time series analysis on the obtained data in current version and the corresponding data in previous version to detect whether there is at least one of an outlier, a change point, a trend, an unimodality, and a clustering.

13. A computer program product stored in a non-transitory computer storage medium and comprises machine-executable instructions which, when executed on a device, cause the device to perform acts comprising:
collecting information associated with a user, the information including a dataset;
automatically determining an analysis preference of the user based on the collected information, wherein determining the analysis preference of the user comprises:
extracting a plurality of charts from the dataset to produce at least one of a data report and a data dashboard;
determining weights of the plurality of charts based on a size and a location of each of the plurality of charts on the data report or the data dashboard; and
determining the preference of the user based on the weights of the plurality of charts;
in response to the dataset being updated, selecting an alert associated with a data change based on the determined analysis preference of the user, the alert selected to be monitored, and when triggered, cause a notification to be generated; and
providing the notification associated with the selected alert to the user.

* * * * *